United States Patent [19]

Sekiguchi

[11] 4,035,034

[45] July 12, 1977

[54] ANTISKID DEVICE FOR AIR BRAKES

[75] Inventor: Yukichi Sekiguchi, Yono, Japan

[73] Assignee: Sanwa Seiki Mfg. Co. Ltd., Japan

[21] Appl. No.: 700,728

[22] Filed: June 28, 1976

Related U.S. Application Data

[63] Continuation of Ser. No. 624,707, Oct. 22, 1975, abandoned.

[51] Int. Cl.$^2$ .......................................... B60T 8/02
[52] U.S. Cl. .................................. 303/115; 303/61; 303/119
[58] Field of Search ................... 188/181 A, 181 R; 303/20, 61, 113, 115, 119

[56] References Cited

U.S. PATENT DOCUMENTS

| | | | |
|---|---|---|---|
| 3,724,915 | 4/1973 | MacDuff | 303/115 |
| 3,741,612 | 6/1973 | Ando | 303/115 |
| 3,749,125 | 7/1973 | Peruglia et al. | 303/119 X |
| 3,854,501 | 12/1974 | Machek | 303/119 X |
| 3,913,983 | 10/1975 | Sekiguchi | 303/119 |

*Primary Examiner* — Duane A. Reger

*Attorney, Agent, or Firm* — Jay L. Chaskin

[57] ABSTRACT

An antiskid device for air brakes comprising a modulator mounted in a pressurized air line connecting a brake valve to brake actuators, and a signal producing means adapted to produce a throttling electric signal and a pressure reducing electric signal whereby the speed of the wheels can be controlled and the slip rate of the wheels can be maintained at an approximate optimum level of 0.2. The modulator comprises a first valve which can move between an open position in which it allows pressurized air from the brake valve to pass freely therethrough and a discharge position in which it causes the pressurized air from the brake actuators to be discharged through an outlet port, a second valve connected in series with the first valve and capable of moving between an open position in which it allows the pressurized air to pass freely therethrough and a throttling position in which it allows the pressurized air to pass therethrough in a reduced quantity, a first valve operating means for operating the first valve and a second valve operating means for operating the second valve.

17 Claims, 9 Drawing Figures

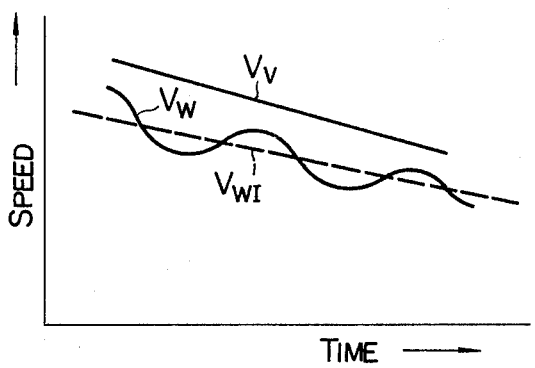
FIG. 6
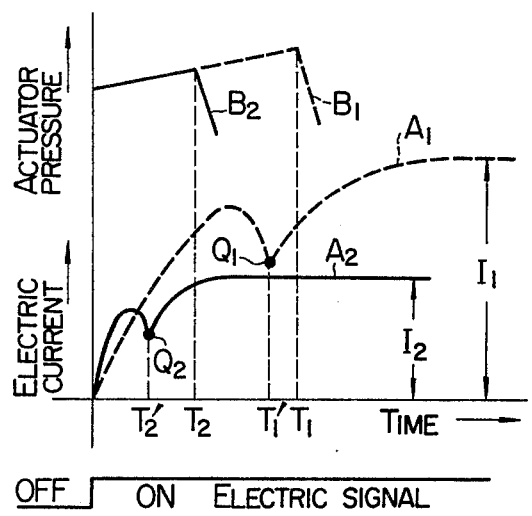
FIG. 8
FIG. 7
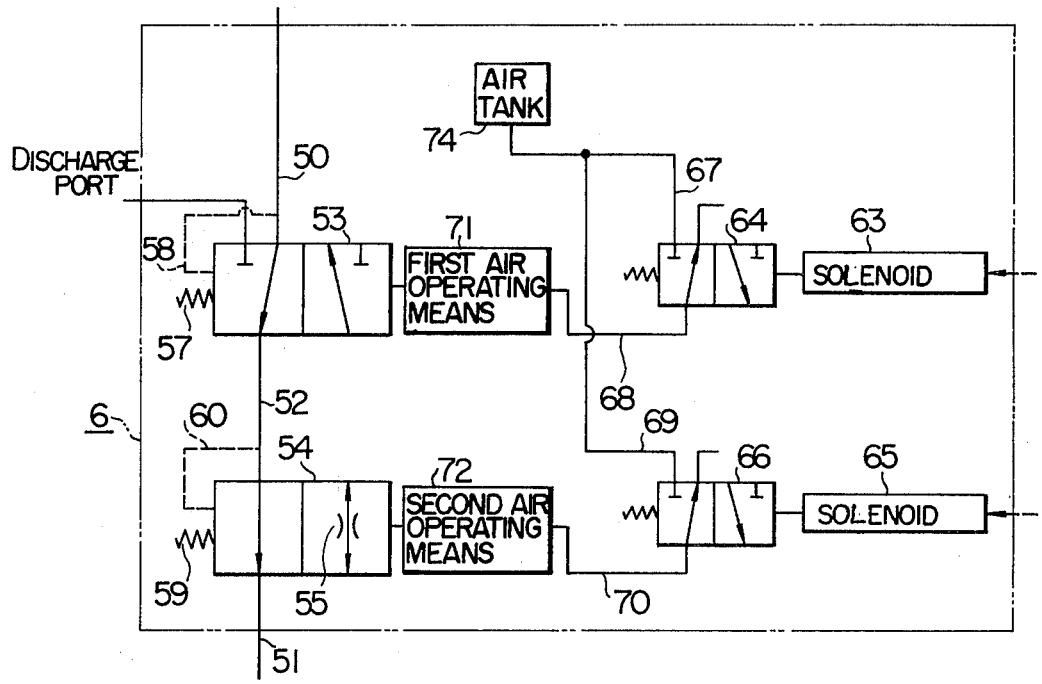
FIG. 9
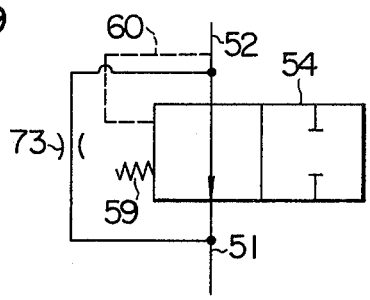

ANTISKID DEVICE FOR AIR BRAKES

This is a continuation, of application Ser. No. 624,707, filed Oct. 22, 1975, now abandoned.

BACKGROUND OF THE INVENTION

This invention relates to air brakes for motor vehicles, and more particularly it is concerned with an antiskid device for air brakes which enables to apply the brake to stop the vehicle in a short braking distance without causing the hazard of skidding when the brake is applied.

The slip rate which indicates the degree of skidding of a wheel rotating on the road surface while the brake is being applied thereto can be expressed as follows:

$$S = \frac{Vv - Vw}{Vv} \text{ or } Vw = (1 - S)Vv$$

where $Vv$ is the speed of the motor vehicle and $Vw$ is the speed of the wheel. When $S=1$, the rotational movement of the wheel is stopped by the high braking force in spite of the fact that the motor vehicle is in operation, so that the wheel is in a locked condition. This presents a hazard because the motor vehicle tends to slip sideways. When $S=0$, the speed of the motor vehicle is the same as that of the wheel and no braking force is transmitted from the wheel to the road surface, so that it is impossible to stop the vehicle unless air resistance or the gradient of the road is utilized. As is well known to a person skilled in the art, $S=0.2$ or thereabout is a slip rate which is desirable because the hazard of sideways skidding can be avoided and the vehicle can be stopped in a short braking distance.

Antiskid devices for air brakes are designed, based on the aforesaid theory, to maintain the slip rate at about 0.2 when the brake is applied. An antiskid device of the prior art comprises a modulator mounted in a pressurized air line connecting a brake valve to brake actuators, and a signal producing means which produces a pressure reducing electric signal when the braking pressure applied by the actuators has reached a pressure increase target value and turns off the pressure reducing electric signal when the braking pressure has reached a pressure decrease target value, such modulator being actuated as the pressure reducing electric signal is turned on or off to thereby decrease or increase the braking pressure applied by the actuators, whereby the speed of the wheels can be varied to maintain the slip rate at an optimum rate of 0.2 or thereabout.

Some disadvantages are associated with antiskid devices of the prior art constructed as aforesaid. For one thing, there is a time lag of the initiation of a decrease or increase in the braking pressure caused by the operation of the modulator behind the turning on or off of a pressure reducing electric signal. This has hitherto caused a rise or a fall in the braking pressure applied by the brake actuators to an unnecessarily high or low level, with the result that skidding of a moderate degree has occurred or the braking force has not been high enough.

SUMMARY OF THE INVENTION

This invention obviates the aforesaid disadvantages of the prior art. Accordingly, the invention has for its object the provision of an antiskid device for air brakes which can minimize an excessive rise or fall in the braking pressure caused by the time lag of the initiation of a decrease or increase in the braking pressure behind the turning on or off of a pressure reducing electric signal to thereby avoid minor skidding or a reduction of the braking pressure below a sufficiently high level, whereby the brake can be applied smoothly and the motor vehicle can have a short braking distance.

The outstanding characteristics of the invention are as follows: The modulator of the antiskid device in accordance with the present invention comprises a first valve which can move between an open position in which it allows pressurized air from the brake valve to pass freely therethrough and a discharge position in which it causes the pressurized air from the brake actuators to be discharged through an outlet port, a second valve connected in series with the first valve and capable of moving between an open position in which it allows the pressurized air to pass freely therethrough and a throttling position in which it allows the pressurized air to pass therethrough in a reduced quantity, a first valve operating means for operating the first valve and a second valve operating means for operating the second valve. The signal producing means of the antiskid device produces, as the braking pressure in the actuators is increasing, a throttling electric signal for actuating the second valve operating means to move the second valve to its throttling position before the braking pressure reaches a pressure increase target value, and produces a pressure reducing electric signal for actuating the first valve operating means to move the first valve to its discharge position when the braking pressure has reached the pressure increase target value, the throttling electric signal being turned off substantially simultaneously as the pressure reducing electric signal is produced so as to return the second valve to its open position. The signal producing means also produces, as the braking pressure in the brake actuators is decreasing, a throttling electric signal for actuating the second valve operating means to move the second valve to its throttling position again before the braking pressure reaches a pressure decrease target value, and turns off the pressure reducing electric signal when the braking pressure has reached the pressure decrease target value so as to actuate the first valve operating means and restore the first valve to its open position. By this arrangement, an increase or decrease in the braking pressure applied by the brake actuators can be made to slow down before the braking pressure reaches the pressure increase target value or pressure decrease target value so as to thereby avoid an excessive rise or fall in the braking pressure above or below the target value which would otherwise occur due to the time lag of the initiation of a decrease or increase in the braking pressure of the brake actuators behind the production or disappearance of a pressure reducing electric signal.

Before giving detailed description of preferred embodiments of the present invention, an antiskid device for air brakes of the prior art will be outlined with reference to the drawing to enable the invention to be clearly understood. A conventional antiskid device for air brakes is generally constructed as shown in FIG. 1 in a block diagram. In the figure, the numeral 4 designates a brake valve adapted to be operated by the driver of a motor vehicle, and the numeral 5 refers to a relay valve for relaying pressurized air produced by the brake valve 4. The pressurized air thus relayed is applied to actuators 3 through a modulator 6 to actuate brake drums 2 and apply the brake to wheels 1 of the motor vehicle. Meanwhile the speed of revolution of each wheel 1 is sensed by a wheel speed sensor 7 and the result is supplied to a computer 8 to determined whether the wheels 1 are in a state of $S=1$ or $S=0$ or drawing near such state.

Many solutions have come to mind to solve the problem of detecting the condition of the wheels, but they all aim at accomplishing the same thing or producing a signal for adjusting the braking pressure so that the wheels 1 may be maintained in a state of $S=0.2$ without being brought to the state of $S=1$ or $S=0$. Accordingly the computer 8 comprise a signal producing means. The signal produced by this means is generally an electric signal which actuates the modulator 6 so as to effect adjustments of the braking pressure applied to each brake actuator 3 to thereby control the condition of operation of each wheel 1.

The operation of the modulator of a conventional antiskid device for air brakes is shown in FIG. 2 in chronological sequence. As shown, the pressurized air in each actuator is discharged when the electric signal is ON and the pressurized air is supplied to each actuator when the electric signal is OFF. In this operation, there is a time lag T of the occurrence of a variation in the braking pressure in the brake actuator due to actuation of the modulator behind switching of the electric signal between ON and OFF states. This causes the braking pressure in each brake actuator to become much higher or lower than is necessary, and the result of this is that the wheels tend to fluctuate between the states of $S=1$ and $S=0$. Thus minor skidding tends to occur or the braking pressure becomes too low. To obviate these disadvantages, proposals have been made to cause the modulator to act promptly, to reduce the distance between the modulator and each brake actuator to reduce the time lag T and to improve the method of detection used by the computer 8 so as to produce an electric signal earlier than usual. None of these measures have however been satisfactory.

The antiskid device for air brakes in accordance with the present invention is constructed such that it enables to minimize an excessive rise or fall in the braking pressure applied by the brake actuator to prevent the occurrence of minor skidding or an excessive fall in braking pressure for a short time interval, thereby permitting the brake to be applied smoothly and efficiently.

The principle of the present invention will now be described with reference to FIG. 3. In the figure, P designates a braking pressure existing in each brake actuator (the pressure P will be hereinafter referred to as a pressure increase target value) at the time the computer produces a pressure reducing signal for reducing the pressure applied by the brake actuator. As aforesaid, there is a time lag T of the initiation of a reduction in the pressure in the brake actuator behind the production of a pressure reduction signal. If the speed at which the pressure in the brake actuator increases is high as indicated by a pressure change line 9, there will be an excess pressure $\Delta P_1$ which is too high and is not desirable. On the other hand, if the speed at which the pressure in the brake actuator increases is low as indicated by a pressure change line 10, there will be an excess pressure $\Delta P_2$ which is small. However, the reduction of the speed of pressure increase to such a level will result in a time interval Ts required for the pressure to reach the pressure increase target value P being greater than a time interval Tq required for the pressure to reach the pressure increase target value P when the speed of pressure change is high. Thus a reduction in the speed at which the pressure increases also has disadvantages because the low braking pressure time interval will be prolonged and consequently the braking distance will become greater.

Meanwhile a similar problem arises regarding a braking pressure existing in each brake actuator (this pressure will be hereinafter referred to as a pressure decrease target value) when the computer turns off a speed reducing signal to increase the braking pressure as the braking pressure in the brake actuator is decreasing.

In the device provided by the invention, the advantages offered by the rapid pressure increase, slow pressure increase, rapid pressure decrease and slow pressure decrease are combined with one another. More specifically, the basic principle of the invention is such that, as the braking pressure applied by the brake actuator is increasing, the pressure is allowed to increase rapidly before the pressure reaches the pressure increase target value and the speed of pressure increase is reduced when the speed draws near the pressure increase target value, and that, as the braking pressure applied by the brake actuator is decreasing, the pressure is reduced rapidly before the pressure reaches the pressure decrease target value and the speed of pressure decrease is reduced when the speed draws near the pressure decrease target value, whereby an excessive rise of the braking pressure relative to the pressure increase target value and an excessive decrease of the braking pressure relative to the pressure decrease target value can be minimized.

BRIEF DESCRIPTION OF THE DRAWINGS

For a better understanding of the invention, reference may be had to the following description taken in conjunction with the accompanying drawings, wherein:

FIG. 6 is a graph showing the wheel speed $V_v$ at the time the brake is applied, the ideal wheel speed $V_{wi}$ and the actual wheel speed $V_w$ at the time the antiskid device according to the invention is used;

FIG. 7 is a diagrammatic view of another embodiment of the invention in which air operating means are used as means for operating the valves;

FIG. 8 is a graph showing the advantages offered by the embodiment shown in FIG. 7; and FIG. 9 is a fragmentary diagrammatic view of another embodiment in which a throttle is provided separately from the second valve and arranged in parallel thereto.

DESCRIPTION OF THE PREFERRED EMBODIMENTS

Figure 1:
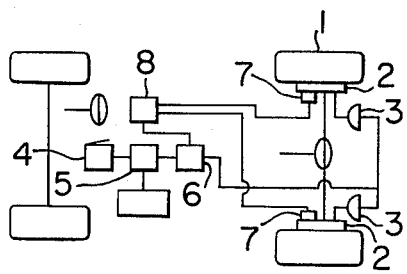
FIG. 1 is a block diagram of an air brake system provided with an antiskid device with which the present invention is concerned.
Figure 2:
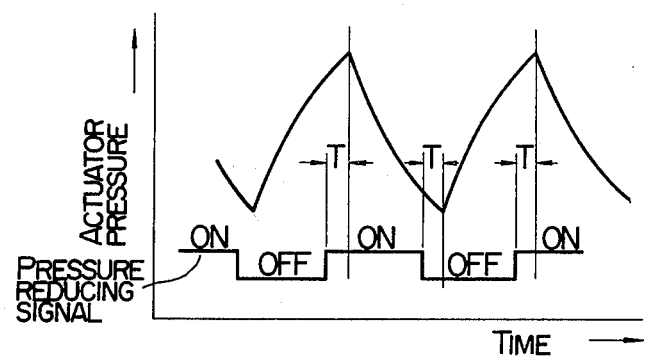
FIG. 2 is a graph showing, in chronological sequence, the relation between pressure reducing signals and the braking pressure of the brake actuator of a conventional antiskid device.
Figure 3:
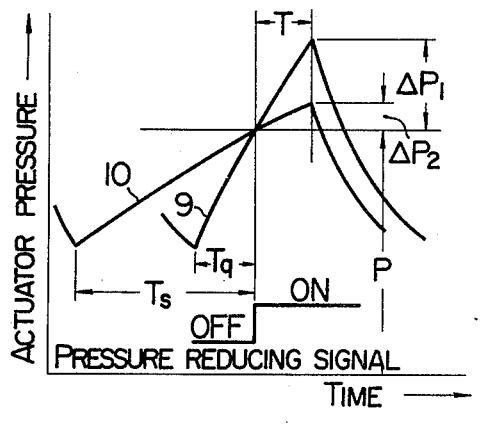
FIG. 3 is a graph showing, in chronological sequence, the relation between the pressure reducing signal and the braking pressure in explanation of the principle of the invention.
Figure 4:
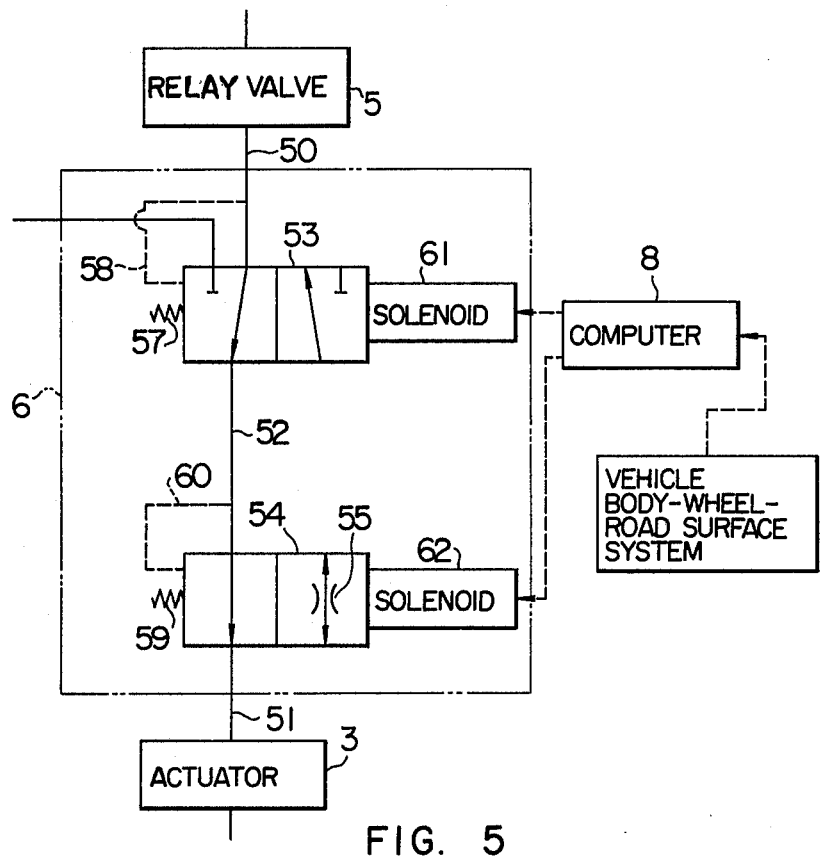
FIG. 4 is a diagrammatic view showing one embodiment of the invention.

Embodiments of the invention will now be described with reference to the drawings. FIG. 4 shows the antiskid device comprising one embodiment of the invention. The antiskid device comprises a relay valve 5 for relaying braking pressure generated by a brake valve or other braking pressure generating source, a modulator 6 connected to the relay valve 5, brake actuator 3 (only one is shown), and a computer 8 detecting the condition of the vehicle body-wheelroad surface system and supplying pressure reducing and throttling signals to the modulator 6.

The modulator 6 comprises a first valve 53 and a second valve 54 connected in series with each other by a pressurized air supply line 52, the first valve 53 being connected to the relay valve 5 through a pressurized air supply line 50 and the second valve 54 being connected to the brake actuator 3 through a pressurized air supply line 51. The first valve 53 can move between an open position in which it permits pressurized air to pass freely therethrough and a discharge position in which it allows the pressurized air to be discharged through an outlet port. The second valve 54 can move between an open position in which it allows the pressurized air to pass freely therethrough and a throttling position in which it allows the pressurized air to pass therethrough in a reduced quantity by means of a throttle 55. The first valve 53 is urged by the biasing force of a spring 57 and preferably by the force of a self-shift 58 to move rightwardly in FIG. 4, so that the first valve 53 is normally disposed in its open position. The second valve 54 is also urged by the biasing force of a spring 59 and preferably by the force of a self-shift 60 to move rightwardly in the figure, so that the second valve is normally disposed in its open position too.

The modulator 6 also comprises a first solenoid 61 and a second solenoid 62 for actuating the first and second valves 53 and 54 respectively. Upon receipt of a pressure reducing electric signal from the computer 8, the first solenoid 61 is energized and moves the first valve from its open position to its discharge position by overcoming the biasing force of spring 57 and the force of self-shift 58. Upon receipt of a throttling electric signal from the computer 8, the second solenoid 62 is energized and moves the second valve 54 to its throttling position by overcoming the biasing force of spring 59 and the force of self-shift 60.

Figure 5:
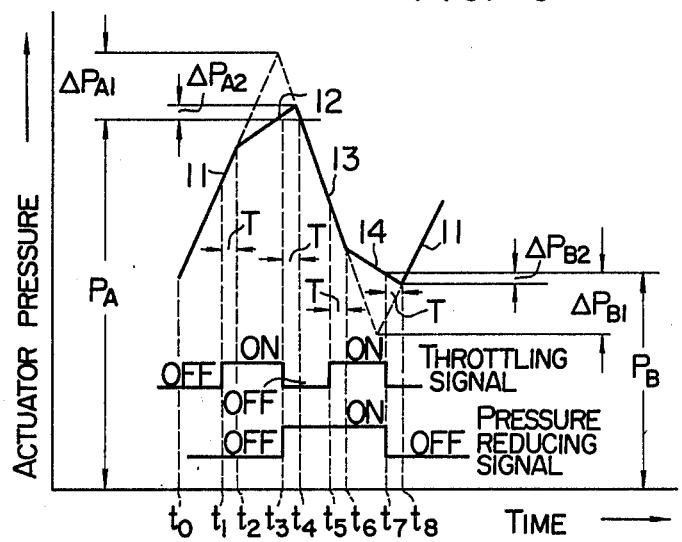
FIG. 5 is a graph showing, in chronological sequence, the relation between the pressure reducing signals and throttling signals and the braking pressure.

The operation of the modulator 6 constructed as aforementioned will be described in chronological sequence by referring to FIG. 5. The modulator 6 shown in FIG. 4 is in a normal state or in a state in which no signal is supplied from the computer 8. Normally the first and second valves 53 and 54 are in open positions and the pressurized air from the relay valve 5 flows successively through line 50, first valve 53, line 52, second valve 54 and line 51 to the brake actuator 3, thereby causing a rapid rise in the braking pressure applied by the brake actuator 3. This is represented in FIG. 6 by a rapid pressure increase line 11 between times $t_0$ and $t_2$. At a time $t_1$ prior to the approaching of the braking pressure to the pressure increase target value P, the computer 8 detects that the braking pressure of the actuator 3 is drawing near the pressure increase target value P, and produces a throttling signal which is supplied to the second solenoid 62 of the modulator 6. This energizes the second solenoid 62, so that the solenoid 62 moves the second valve 54 leftwardly in FIG. 4 or to its throttling position from its open position in which it is normally disposed. Thus the throttle 55 is interposed between lines 51 and 52 so as to reduce the quantity of pressurized air flowing to the actuator 3, thereby slowing down the rise in braking pressure. That is, the increase in braking pressure is slowed down as indicated by a slow pressure increase line 12 starting at the time $t_2$ with a time lag T of $t_2$ behind $t_1$ as shown in FIG. 5.

Upon the actuator pressure reaching the pressure increase target value P, the computer 8 detects this (at a time $t_3$) and supplies a pressure reducing signal to the first solenoid 61 shown in FIG. 4 while turning off the aforesaid throttling signal. This de-energizes the second solenoid 62 and restores the second valve 54 to its open position, while the first solenoid 61 is energized and moves the first valve 53 leftwardly in FIG. 4 to its discharge position from its open position in which it is normally disposed by virtue of the biasing force of spring 57 and the force of self-shift 58.

This brings lines 51 and 52 in communication with each other again, while lines 50 and 52 are disconnected and line 52 is connected to the outlet port. Thus the pressurized air in the actuator 3 is vented to atmosphere through the outlet port. Referring to FIG. 5, the throttling signal is turned off and the pressure reducing signal is turned on at the time $t_3$ and the braking pressure rapidly decreases starting at a time $t_4$ after a time lag T as indicated by a rapid pressure decreasing line 13.

As the braking pressure applied by the brake actuator 3 rapidly decreases, the computer 8 detects that the braking pressure is drawing near the pressure decrease target value and produces a throttling signal again at a time $t_5$ before the braking pressure approaches the pressure decrease target value $P_B$. Accordingly, the second valve 54 is moved to its throttling position again by the action of solenoid 62, thereby reducing the speed at which the braking pressure decreases. Referring to FIG. 5, the pressure decrease is slowed down as indicated by a slow pressure decrease line 14 starting at a time $t_6$ following a time lag T of $t_6$ behind $t_5$.

Upon the actuator pressure reaching the pressure decrease target value, the computer 8 detects this (at a time $t_7$) and simultaneously turns off the throttling signal and speed reducing signal. This restores both the first and second valves 53 and 54 to their open positions, so that the pressurized air from the relay valve 5 flows into the actuator 3 again, thereby rapidly increasing the braking pressure applied by the actuator 3. This rapid raise in pressure is represented in FIG. 5 by a rapid pressure increase line 11 which shows that a rapid rise in pressure starts at a time $t_8$ after a time lag T of $t_8$ behind $t_7$.

The aforementioned cycle of operations from the time $t_0$ to the time $t_8$ is repeated, so that the speed of revolution of the wheel can be controlled such that it is, as represented by a curve Vw in FIG. 6, near an ideal speed $V_{wI}$ in which $S=0.2$ relative to a vehicle speed Vv.

From the foregoing description, it will be appreciated that in the device according to the invention, a throttling electric signal is produced before the braking pressure reaches the pressure increase target value or pressure decrease target value to slow down an increase or decrease in the braking pressure about the time the braking pressure reaches the pressure increase target value or pressure decrease target value. By this arrangement, it is possible to greatly reduce an excessive rise or fall in the braking pressure which occurs due to the time lag of the initiation of a decrease or increase in the braking pressure behind the turning on or off of a pressure reducing signal, as indicated by symbols $\Delta P_{A2}$ and $\Delta P_{B2}$ (this invention) and symbols $\Delta P_{A1}$ and $\Delta P_{B1}$ (the prior art) in FIG. 5.

FIG. 7 shows another embodiment of the invention in which air operating means are used as means for operating the first and second valves 53 and 54 in place of the solenoids 61 and 62 as shown in FIG. 4. More specifically, the modulator 6 comprises a first air operating means 71 and a second air operating means for operating the first valve 53 and the second valve 54 respectively. The first and second air operating means 71 and 72 are connected to an air tank 74 by lines 67, 68 and 69, 70 through electromagnetic valves 64 and 66 having solenoids 63 and 65, respectively. Upon receipt of pressure reducing and throttling signals from the computer 8, solenoids 63 and 65 are energized and actuate electromagnetic valves 64 and 66 to bring lines 67 and 68 and 69 and 70 in communication with each other. Thus the air operating means 61 and 62 are actuated and cause the first and second valves 53 and 54 to move to their discharge and throttling positions against the biasing forces of springs 57 and 59 and the forces of self-shifts 58 and 60 respectively.

The disadvantages offered by the use of pressurized air for operating the first and second valves 53 and 54 in the embodiment shown in FIG. 7 will be described with reference to FIG. 8. In case a valve is directly actuated by a solenoid, a plunger of the solenoid will have a heavy weight and consequently the time constant of the current in the coil will be increased. Thus, as represented by a broken line $A_1$ in FIG. 8, the plunger will reach the end of its stroke at a point $Q_1$ after lapse of a time $T'_1$ following the generation of an electric signal. Accordingly, the braking pressure of the brake actuator will, as represented by a broken line $B_1$, begin to respond after lapse of a time $T_1$. The difference in time between $T'_1$ and $T_1$ is due to the presence of a passage between the valve and the brake actuator.

On the other hand, the use of air operating means for operating the valves as is the case with the present invention can produce a quick response in the current in the coil because a solenoid of a small size can be used for actuating each air operating means. As indicated by a point $Q_2$ in a solid line $A_2$, the stroke reaches its end after lapse of a time $T'_2$ following the production of an electric signal. Whereas $T'_1$ is substantially in a range between 15 and 20 ms, $T'_2$ is substantially in a range between 3 and 8 ms. This means that the operation speed is three times as high when air operating means is used as when no air operating means is used. It takes about 1 to 3 ms for the air operating means to actuate the valve. Even if this delay is added to the delay of the pressurized air reaching the actuator, the overall delay $T_2$ is much shorter than $T_1$. Moreover, since the electric current consumed by the solenoid is very small as shown, the use of air operating means is economical.

The use of the air operating means has added advantages. Since the modulator using the air operating means produces a higher power per unit weight, the invention makes it possible to obtain an overall compact size in a modulator. This makes the antiskid device highly resistant to vibration and reliable in performance.

FIG. 9 shows another embodiment of the invention in which a throttle 73 is provided independently of the second valve 54 and arranged in parallel thereto, in place of using the throttle 55 built in the valve 54 as shown in FIG. 4 and FIG. 7. In this embodiment, the second valve 54 moves from an open position to a closed position when operated by a valve operating means. When the second valve 54 is in its closed position, the pressure air flows through the throttle 73 by bypassing the second valve 54. The use of the throttle 73 as shown in FIG. 9 makes it possible to selectively use any throttle as desired or to readily replace the old throttle by a new one, while the valve of the same standards can be used at all times. This offers advantages in production and maintenance. Various modifications and changes can be made in the disclosed and described invention and the several embodiments thereof by one skilled in the art without departing from the scope of the invention. The scope of the invention therefore is to be determined by the claims appended hereto.

I claim:

1. An antiskid device for fluid pressure operated brakes having a signal producing means for producing a fluid pressure reducing signal when the fluid braking pressure has reached a pressure increase target value and to remove said pressure reducing signal when the braking pressure has reached a fluid pressure decrease target value; a modulator means responsive to the signal producing means to decrease or increase the braking pressure, the modulator comprising a first valve means movable between an open position allowing fluid pressure to pass therethrough and a pressure discharge position; a second valve means connected in series with said first valve means movable between an open position allowing fluid pressure to pass therethrough and a throttling position in which the fluid pressure passes therethrough in a reduced quantity; said signal producing means providing signals for sequentially and simultaneously actuating said first and second valve means whereby the rate of increase or the rate of decrease in the braking pressure is lessened before the braking pressure reaches the pressure increase target value or pressure decrease target value so as to thereby avoid an excessive rise or fall in the braking pressure above or below the respective target values.

2. An antiskid device according to claim 1 wherein the first and second valves are in the normally open position and when actuated the first valve is in the discharge position and the second valve is in the throttling position.

3. An antiskid device according to claim 1 including a first valve operating means for actuating said first valve and a second valve operating means for actuating said second valve.

4. An antiskid device according to claim 1 wherein the signal producing means sequentially produces, as the braking pressure is increasing, a throttling signal for actuating the second valve means to the throttling position before the braking pressure reaches the pressure increase target value, said signal producing means producing the pressure reducing signal for actuating the first valve means to the discharge position when the braking pressure has reached the pressure increase target value, the second valve means being substantially simultaneously deactuated to the open position.

5. An antiskid device according to claim 4 wherein the signal producing means sequentially produces, as the braking pressure is decreasing, a throttling signal for actuating the second valve means to the throttling position before the braking pressure reaches the pressure decrease target value; and said signal producing means removing the pressure reducing signal when the braking pressure reaches the pressure decrease target value to actuate the first valve means to the open position.

6. An antiskid device according to claim 3 wherein the first and second valve operating means are operated by fluid pressure.

7. An antiskid device according to claim 1 wherein the second valve means is movable between the open position and a closed position in which the pressure is not permitted to pass therethrough, and a throttle means is arranged in parallel to said second valve means, the throttle means allowing the pressure to pass therethrough in a reduced quantity.

8. An antiskid device according to claim 3 wherein the first and second valve operating means are electromagnetic means.

9. An antiskid device according to claim 1 wherein the second valve means has incorporated therein a throttle means.

10. An antiskid device according to claim 6 wherein the first and second valve operating means are further actuated by electromagnetic means.

11. An antiskid device according to claim 9 including a first valve operating means for actuating said first valve and a second valve operating means for actuating said second valve means.

12. An antiskid device according to claim 5 wherein the second valve means is movable between the open position and a closed position in which the pressure is not permitted to pass therethrough, and a throttle means is arranged in parallel to said second valve means, the throttle means allowing the pressure to pass therethrough in a reduced quantity.

13. A method of applying braking pressure to fluid pressure operated brakes comprising the steps of
   a. permitting a rapid rate of pressure increase towards a pressure increase target valve;
   b. reducing the rate of pressure increase to less than the rapid increase rate when the pressure nears the pressure increase target valve;
   c. permitting a rapid rate of pressure decrease towards a pressure decrease target value; and
   d. reducing the rate of pressure decrease to less than the rapid decrease rate when the pressure nears the pressure decrease target valve,
   whereby an excessive rise of the braking pressure relative to the pressure increase target value and an excessive decrease of the braking pressure relative to the pressure decrease target value is minimized.

14. A method according to claim 13 including a first and second valve means comprising the steps of
   a. actuating the second valve means to a throttling position to reduce the rate of pressure increase before the braking pressure reaches the pressure increase target valve;
   b. actuating the first valve means to a pressure discharge position when the braking pressure has reached the pressure increase target value, the second valve means being substantially simultaneously actuated to an open position;
   c. actuating the second valve means to the throttling position before the braking pressure reaches the pressure decrease target value; and
   d. actuating the first valve means to the open position when the braking pressure reaches the pressure decrease target valve.

15. A method according to claim 13 wherein the steps are cyclically repeated.

16. A method according to claim 14 wherein the steps are cyclically repeated.

17. A method according to claim 13 wherein the brakes are applied to the wheels of a vehicle, such that the speed of revolution of the wheels is 0.2 relative to the vehicle speed.

* * * * *